United States Patent
Ballantyne et al.

(10) Patent No.: US 8,683,325 B1
(45) Date of Patent: Mar. 25, 2014

(54) INDEXED APPROACH FOR DELIVERING MULTIPLE VIEWS OF AN XML DOCUMENT FROM A SINGLE XSLT FILE

(75) Inventors: Robert Andrew Ballantyne, Mansfield, MA (US); Utkarsh Vipul, Westborough, MA (US)

(73) Assignee: EMC Corporation, Hopkinton, MA (US)

(*) Notice: Subject to any disclaimer, the term of this patent is extended or adjusted under 35 U.S.C. 154(b) by 739 days.

(21) Appl. No.: 12/270,447

(22) Filed: Nov. 13, 2008

(51) Int. Cl.
*G06F 17/00* (2006.01)

(52) U.S. Cl.
USPC ............ 715/236; 715/234; 715/248; 715/777

(58) Field of Classification Search
None
See application file for complete search history.

(56) References Cited

U.S. PATENT DOCUMENTS

| | | | |
|---|---|---|---|
| 7,395,497 B1 | 7/2008 | Chaulk et al. | |
| 7,640,496 B1 | 12/2009 | Chaulk et al. | |
| 2002/0010716 A1* | 1/2002 | McCartney et al. | 707/517 |
| 2002/0112052 A1* | 8/2002 | Brittingham et al. | 709/224 |
| 2003/0221170 A1* | 11/2003 | Yagi | 715/517 |
| 2004/0017391 A1* | 1/2004 | Druyan et al. | 345/738 |
| 2005/0050457 A1* | 3/2005 | Kurumatani | 715/513 |
| 2005/0132284 A1* | 6/2005 | Lloyd et al. | 715/517 |
| 2005/0262440 A1* | 11/2005 | Stanciu et al. | 715/523 |
| 2008/0098301 A1* | 4/2008 | Black et al. | 715/246 |
| 2008/0183746 A1* | 7/2008 | Gutjahr et al. | 707/102 |
| 2009/0276448 A1* | 11/2009 | Coleman | 707/101 |

* cited by examiner

*Primary Examiner* — Stephen Hong
*Assistant Examiner* — Keith Bloomquist
(74) *Attorney, Agent, or Firm* — BainwoodHuang

(57) ABSTRACT

A method is provided. The method includes (1) placing, within a common style file, definitions of each of a plurality of transformations for displaying the contents of a data file, wherein the definitions of at least two of the transformations are different from each other, (2) encoding, within a display file, instructions for (a) providing a user with a choice to select a particular transformation and (b) causing the contents of a data file to be displayed according to a transformation selected by a user, and (3) distributing the style file and the display file to a user. Related methods are also provided, as well as data structure, encoded in a computer-readable storage medium, for use in practicing these methods.

6 Claims, 4 Drawing Sheets

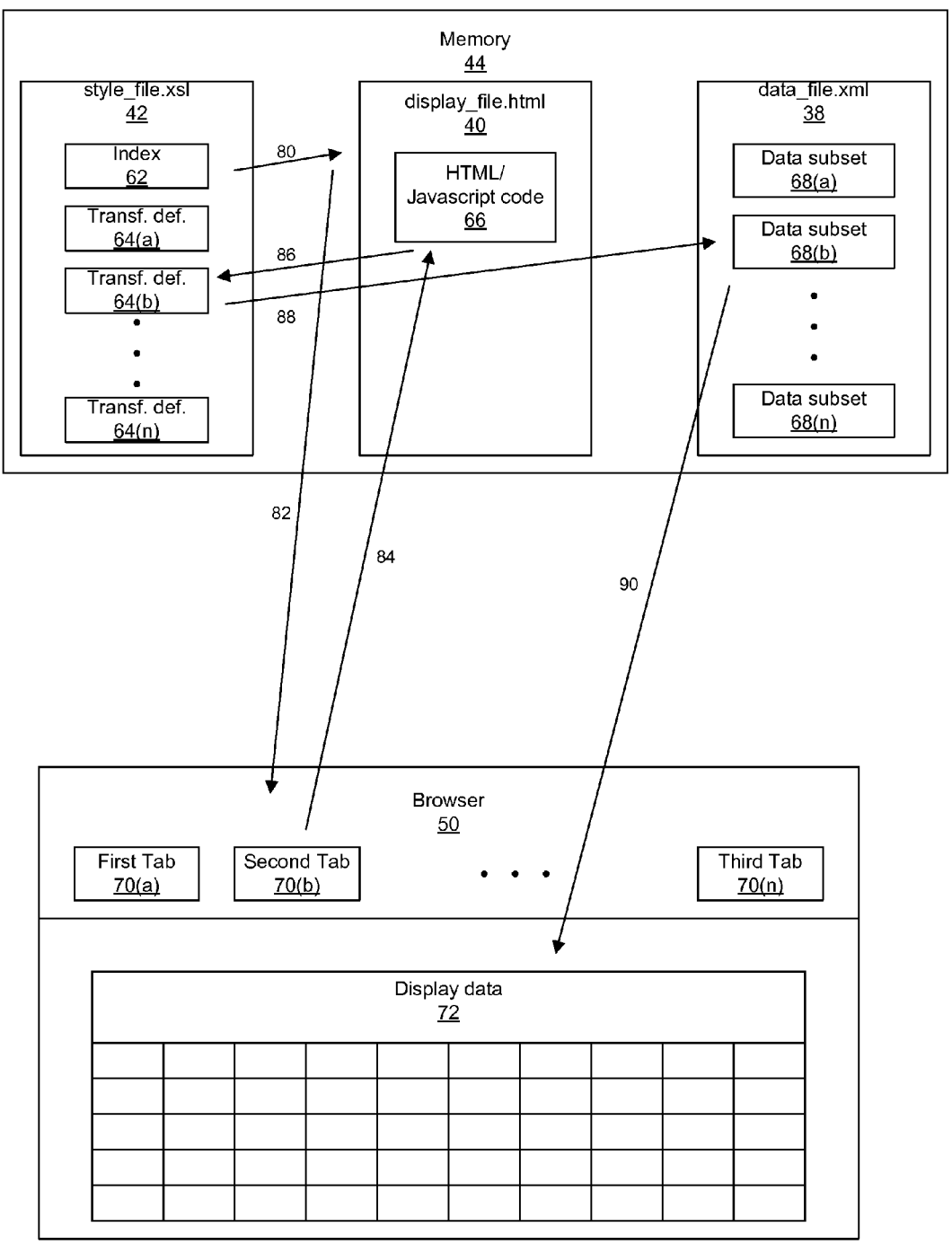

Fig. 3

```
<?xml version="1.0" encoding="ISO-8859-1" ?>
<xsl:stylesheet xmlns:xsl="http://www.w3.org/1999/XSL/Transform" version="1.0">
<xsl:output method="html" encoding="UTF-8" />

<xsl:param name="mode" select="'DEFAULT'" />

<xsl:template match="/">
    <xsl:choose>

<xsl:when test="$mode='DEFAULT'">
            <div id="MasterIndex">
                <div title="First Tab" id="mode1"> </div>
                <div title="Second Tab" id="mode2"> </div>
                <div title="Third Tab" id="mode3"> </div>
            </div>
        </xsl:when>

<xsl:when test="$mode='mode1'">
            <div title="First Tab" id="mode1">
                <xsl:call-template name="mode1" />
            </div>
        </xsl:when>

<xsl:when test="$mode='mode2'">
            <div title="Second Tab" id="mode2">
                <xsl:call-template name="mode2" />
            </div>
        </xsl:when>

<xsl:when test="$mode='mode3'">
            <div title="Third Tab" id="mode3">
                <xsl:call-template name="mode3" />
            </div>
        </xsl:when>

</xsl:choose>
</xsl:template>

<xsl:template name="mode1"> [ first transformation details...] </xsl:template>
<xsl:template name="mode2"> [ second transformation details...] </xsl:template>
<xsl:template name="mode3"> [ third transformation details...] </xsl:template>

</xsl:stylesheet>
```

Labels: 42, 62, 64(a), 64(b), 64(n)

INDEXED APPROACH FOR DELIVERING MULTIPLE VIEWS OF AN XML DOCUMENT FROM A SINGLE XSLT FILE

BACKGROUND

Extensible Markup Language (XML) is used to store data in a marked-up text format. XML is often used to store data which can then be displayed on a web browser by using Extensible StyleSheet Language Transforms (XSLT). In the case of a large XML file containing a large quantity of data about multiple subjects, it may be unwieldy or confusing to display all the data within one window or one page. Thus, the data of large XML files is often displayed on several web pages, each web page potentially displaying a different subset of the data with potentially different styles or views.

This is most commonly done by distributing a set of Extensible StyleSheet Language (XSL) files, each XSL file transforming the XML file into a web page displaying a subset of the data. Some form of documentation may also be distributed, allowing users to choose which XSL file to use to transform the XML data.

SUMMARY

Unfortunately, the above-described approach suffers from two deficiencies. In order to display the data, a large number of XSL files must be distributed to users. This is not a practical method of distribution. Also, a user must know which XSL file to use for a given display. Thus, embodiments of the present invention are directed at techniques and structures for displaying multiple views of data with only a single XSL file. Such techniques are well-suited to distributing via a variety of media, such as, for example, by e-mail to a customer.

In one embodiment, a method is provided. The method includes (1) placing, within a common style file, definitions of each of a plurality of transformations for displaying the contents of a data file, wherein the definitions of at least two of the transformations are different from each other, (2) encoding, within a display file, instructions for (a) providing a user with a choice to select a particular transformation and (b) causing the contents of a data file to be displayed according to a transformation selected by a user, and (3) distributing the style file and the display file to a user.

In another embodiment, another method is provided. This method includes (1) reading an index of transformations from a style file, the index including a reference to a definition of each transformation, the definition of each transformation being located within the same style file, the definition of at least one of the transformations being distinct from the definition of at least one of the other transformations, (2) displaying, to a user, a choice between the transformations read from the index, (3) receiving, from the user, a selection of a transformation of the transformations read from the index, and (4) directing a web browser to display contents of a data file according to the definition of the transformation selected by the user.

In another embodiment, a data structure is provided. The data structure is encoded in a computer-readable storage medium. It includes (1) an index of a set of available transformations for displaying the contents of an XML data file, and (2) a definition of each of the available transformations, wherein the definition of at least one of the available transformations is distinct from the definition of at least one of the other available transformations. The computer file is in compliance with XSL.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 illustrates an example process of one embodiment.

FIG. 3 illustrates an example XSL file of one embodiment.

DETAILED DESCRIPTION

Figure 1:
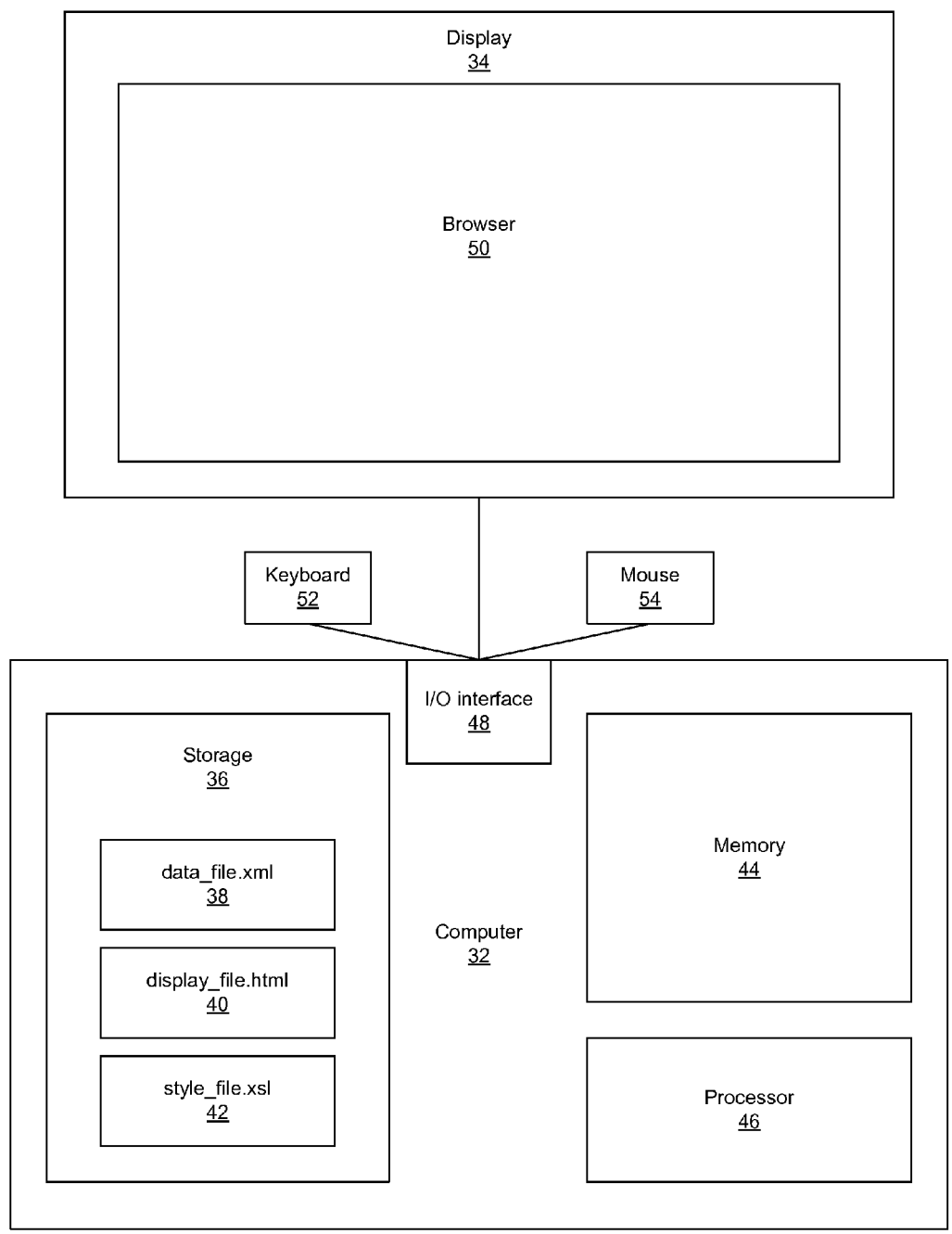
FIG. 1 illustrates an example system for use in practicing various embodiments.

FIG. 1 illustrates a system 30 for displaying particular contents of a data file based on a selected transformation from multiple selectable transformations residing in a common style file. System 30 includes a computer 32 and a display 34. Display 34 can include, for example, a computer monitor.

Computer 32 includes persistent data storage 36, such as, for example, a hard disk drive, a redundant array of inexpensive disks (RAID), a flash drive, etc. While data storage 36 is depicted as residing within computer 32, it should be understood that this is by way of example only. Data storage 36 may also reside external to the computer. For example, data storage 36 may include a storage area network or network attached storage. Data storage 36 stores computer files. In particular, data storage stores 3 files. One file is a data file 38 (for example data_file.xml), preferably in XML format. A second file is a display or index file 40 (for example display_file.html), preferably in HTML format (with JavaScript code embedded therein). A third file is a stylesheet file 42 (for example style file.xml), preferably in XSL or XSLT format. In some embodiments, display file 40 and stylesheet file 42 may be combined into a single file. Computer 32 also includes memory 44, a processor 46, and an Input/Output (I/O) interface 48.

I/O interface 48 connects to display 34. Display 34 displays a browser window 50. I/O interface 48 also connects to keyboard 52 and mouse 54 to receive user input. It should be understood that other input devices may be used instead of or in addition to keyboard 52 and mouse 54. It should also be understood that I/O interface 48 need not consist of a single subsystem. In some embodiments, I/O interface 48 may include a Universal Serial Bus (USB) interface and/or a PS/2 interface for connecting to the input devices, as well as a video graphics card for connecting to the display 34.

FIG. 2 depicts a process 60 of one embodiment that may be executed by processor 46 to display data from the data file 38 in accordance with stylesheet file 42. Data file 38, display file 40, and stylesheet file 42 are loaded into memory 44. Style file 42 includes a transformation index 62 as well as a set of transformation definitions 64(a), 64(b), . . . , 64(n) (collectively transformation definitions 64). Display file 40 includes HTML code and JavaScript code 66. Data file 38 includes data 68. Data 68 may be logically divided into several data subsets 68(a), 68(b), . . . , 68(n). It should be understood that in one embodiment the various subsets 68(x) of data 68 may be entirely distinct from one another, not sharing any data. In another embodiment the various subsets 68(x) of data 68 may overlap with one another; thus subset 68(a) may include some data present in subset 68(b), but subsets 68(a) and 68(b) might still each include data not present in the other. In yet another embodiment, data 68 may not be differentiated into subsets 68(*x*) at all. Browser 50, also depicted in FIG. 2, displays various tabs 70(*a*), 70(*b*), . . . , 70(*n*), which in one embodiment may logically correspond to transformation definitions 64(*a*), 64(*b*), . . . , 64(*n*) and to data subsets 68(*a*), 68(*b*), . . . , 68(*n*). Browser 50 also optionally displays display data 72.

A user of the computer 32 is able to load display file 40 within browser 50. In one embodiment, the user will then be able to select data file 38 for display. JavaScript code 66 from display file 40 runs within the browser 50, executing process 60 on processor 80. In step 80, the transformation index 62 is read from stylesheet file 42. It should be understood that the term "index" in the context of this application should be taken in its ordinary sense—i.e., "a list or table of references to items"—in this case, a list or table of references (including titles) to transformation definitions. The transformation index 62 indicates which transformations are defined within the stylesheet file 42 and are thus available to display data from data file 38. Based on the transformation index 62, JavaScript code 66, in step 82, is then able to generate the set of tabs 70 to be displayed within the browser 50 to the user. Upon a user selecting one of the tabs 70, for example tab 70(*b*) in step 84, JavaScript code 66 is able to call a particular transformation definition 64, for example transformation definition 64(*b*) in step 86. The selected transformation definition 64 (in this example, transformation definition 64(*b*)) is then applied to data file 38, in order to generate display data 72 from the appropriate data subset 68 (in this example, data subset 68(*b*)). JavaScript code 66 utilizes the HTML Document Object Model (DOM) in order to dynamically modify the contents of the web page displayed by the browser 50 to conform with the selected transformation definition. In some embodiments, the open-source Prototype JavaScript framework is used to accomplish this.

Thus, in the context of a data storage system for example, first tab 70(*a*) might indicate "hardware configuration," while second tab 70(*b*) indicates "logical configuration" and third tab 70(*n*) indicates "software configuration." Thus, when the user selects first tab 70(*a*), the display data 72 might include a table indicating all disk drives attached to a data storage system as well as a table indicating all storage controllers within the system. When the user selects second tab 70(*b*), the display data 72 might include a table indicating all logical units of data (LUNs) within the data storage system as well as a table indicating all RAID controllers within the system. When the user selects third tab 70(*n*), the display data 72 might include a table indicating all software packages installed within the data storage system.

The process 60 of FIG. 2 may be implemented in software. The software may be stored on a tangible computer-readable medium. A tangible computer-readable medium may include, for example, a magnetic disk, an optical disk, or a non-volatile flash-based memory device. When executed by a computer, the software causes the process 60 to be performed. FIG. 3 depicts an example stylesheet file 42 in more detail. Stylesheet file 42 includes various XSL header information as well as optional parameter, variable, and key information as is well-understood in the art. Style file 42 includes transformation index 62, which takes the form of an HTML <div> tag storing a set of additional <div> tags therein. The outer <div> tag is identified as depicting "MasterIndex," and it is invoked when the default mode is invoked (which occurs when the stylesheet file 42 is first called with no parameters). The inner <div> tags each have a different id element, which identifies the mode of the associated transformation definition 64, and each <div> tag also includes a corresponding title of a tab 70 to be displayed corresponding to the associated transformation definition 64.

Each transformation definition 64 is bracketed by an xsl:when tag, which tests for an input parameter corresponding to the mode of that transformation definition 64. Upon finding a match, XSL data is output to allow HTML to be generated from the appropriate data subset 68 of data file 38. It should be understood that in some embodiments, the XSL data of the various transformation definitions 64 differs such that a style of HTML output differs between the various display modes.

In another embodiment, each transformation mode is executed and a spreadsheet file, such as, for example, a spreadsheet file in Microsoft Excel format, is output. Each spreadsheet file includes multiple sheets, each sheet corresponding to the display data 72 of one transformation definition 64, such that the spreadsheet file contains one sheet corresponding to each transformation definition 64 as indexed by transformation index 62. In yet another embodiment, each transformation may output HTML code into an application which is capable of converting HTML code into an application-specific format, such as a database or word processing format. In yet other embodiments, each transformation may output XML code or plaintext.

Figure 4:
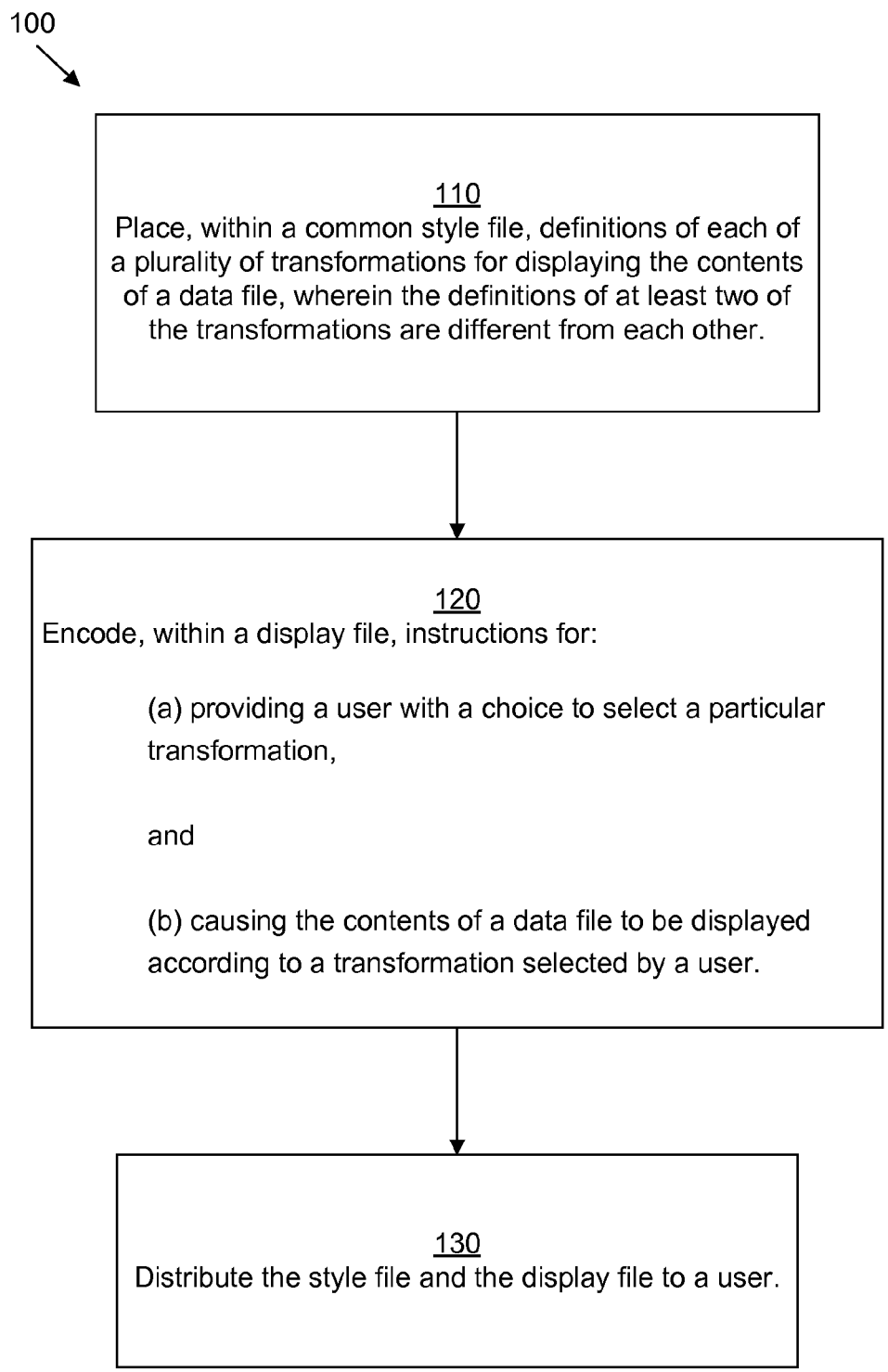
FIG. 4 illustrates an example method of one embodiment.

FIG. 4 depicts a method 100 according to one embodiment. In step 110, a developer places a set of transformation definitions 64 within one stylesheet file 42, such as in XSLT. In some embodiments, developer also includes a transformation index 62 within the same stylesheet file 42. At least one transformation definition 64(*a*) differs from at least one other transformation definition 64(*b*). Transformation definitions 64 define transformations between data 68 of a data file 38 and an output format, such as HTML code.

In step 120, developer encodes within a display file 40, instructions for (a) providing a user with a choice to select a particular transformation, and (b) causing the contents of a data file to be displayed according to a transformation selected by a user. Thus, JavaScript code 66 within display file 40 is encoded to (a) extract the transformation index 62 from stylesheet file 42 and construct the set of tabs 70 based on the extracted data, and (b) call the appropriate transformation definition 64 corresponding to the user's choice by calling the stylesheet file 42 with the appropriate mode parameter.

In step 130, the developer distributes the stylesheet file 42 and the display file 40 to the user. Thus, the user is able to dynamically display any XML data file 38 having the correct format with the use of just these two files.

Thus, methods and structures have been described for displaying multiple views of data with only a single XSL file. While various embodiments of the invention have been particularly shown and described, it will be understood by those skilled in the art that various changes in form and details may be made therein without departing from the spirit and scope of the invention as defined by the appended claims.

For example, while embodiments have been described as operating in a data storage system context, the invention is not so limited. Thus, in other embodiments, the data 68 of data file 38 may represent anything, such as, for example, exit poll responses.

Furthermore, it should be understood that all embodiments which have been described may be combined in all possible combinations with each other, except to the extent that such combinations have been explicitly excluded.

What is claimed is:

1. A method comprising:
    placing, within a single style sheet transformations file,
        definitions of a plurality of distinct transformations for displaying contents of a single data file, the single stylesheet transformations file including executable code for encoding presentation formatting for the data file to the exclusion of content information, the data file including content information encoded within semantic markup to the exclusion of presentation formatting, each distinct transformation being configured to yield a distinct data presentation, each distinct data presentation representing a different view of data from the data file;

placing, within the single style sheet transformations file, an index to the plurality of distinct transformations, the index including a list of references to respective transformations of the plurality of distinct transformations; and encoding, within a display file, a set of instructions, which, when executed by a browser running on a computing device, cause the computing device to:
load the index from the single style sheet transformations file;
generate a set of browser tabs, each browser tab of the set of browser tabs being uniquely associated with a respective transformation listed by the index;
display the set of browser tabs within a browser window of a display device; and
upon receiving a user selection of a particular browser tab of the set of browser tabs:
cause the transformation of the plurality of distinct transformations uniquely associated with the user-selected browser tab to be applied to the data file, yielding a generated data presentation; and
display the generated data presentation within the browser window of the display device.

2. The method of claim 1 wherein the single style sheet transformations file is an XSLT file; and
placing the definitions of the plurality of distinct transformations within the single style sheet transformations file includes encoding the definitions of the plurality of distinct transformations in XSLT format within the single style sheet transformations file.

3. The method of claim 1 wherein:
the data file is an XML file; and
the content information includes configuration information about a configurable system, the configuration information being encoded within semantic XML markup of the data file.

4. The method of claim 3 wherein:
the configuration information includes a plurality of non-null data subsets, each data subset defining distinct configuration information regarding a distinct aspect of the configurable system; and
placing the definitions of the plurality of distinct transformations within the single style sheet transformations file includes:
placing a first transformation of the plurality of distinct transformations within the single style sheet transformations file, the first transformation being configured to yield a first data presentation representing a view of a first data subset of the plurality of non-null data subsets; and
placing a second transformation of the plurality of distinct transformations within the single style sheet transformations file, the second transformation being configured to yield a second data presentation representing a view of a second data subset of the plurality of non-null data subsets, the second data subset being distinct from the first data subset.

5. The method of claim 1 wherein placing the definitions of the plurality of distinct transformations within the single style sheet transformations file includes:
placing a first transformation of the plurality of distinct transformations within the single style sheet transformations file, the first transformation being configured to yield a first data presentation representing a view of a data subset of the data file according to a first style; and
placing a second transformation of the plurality of distinct transformations within the single style sheet transformations file, the second transformation being configured to yield a second data presentation representing a view of the data subset of the data file according to a second style distinct from the first style.

6. A method performed by a computing device, the method comprising executing, by a browser operating on the computing device, a set of instructions from a display file, which, when executed, cause the computing device to perform the following operations:
loading, from a single style sheet transformations file, an index to a plurality of distinct transformations placed within that single style sheet transformations file, the single stylesheet transformations file including executable code for encoding presentation formatting for a data file to the exclusion of content information, the data file including content information encoded within semantic markup to the exclusion of presentation formatting, each distinct transformation being configured to yield a distinct data presentation, each distinct data presentation representing a different view of data from the data file, the index including a list of references to respective transformations of the plurality of distinct transformations;
generating a set of browser tabs, each browser tab of the set of browser tabs being uniquely associated with a respective transformation listed by the index;
displaying the set of browser tabs within a browser window of a display device; and
upon receiving a user selection of a particular browser tab of the set of browser tabs:
causing the transformation of the plurality of distinct transformations uniquely associated with the user-selected browser tab to be applied to the data file, yielding a generated data presentation; and
displaying the generated data presentation within the browser window of the display device.

* * * * *